(12) United States Patent
Ong (10) Patent No.: US 9,975,286 B2
(45) Date of Patent: May 22, 2018

(54) METHOD FOR MANUFACTURING A COMPOSITE MATERIAL MADE ORNAMENT

(71) Applicant: Ching-Long Ong, Taichung (TW)

(72) Inventor: Ching-Long Ong, Taichung (TW)

( * ) Notice: Subject to any disclaimer, the term of this patent is extended or adjusted under 35 U.S.C. 154(b) by 697 days.

(21) Appl. No.: 14/515,207

(22) Filed: Oct. 15, 2014

(65) Prior Publication Data

US 2016/0107339 A1   Apr. 21, 2016

(51) Int. Cl.
| | | |
|---|---|---|
| B29C 45/14 | (2006.01) | |
| B32B 5/02 | (2006.01) | |
| B32B 5/22 | (2006.01) | |
| B32B 5/26 | (2006.01) | |
| B32B 3/26 | (2006.01) | |

(52) U.S. Cl.
CPC .. *B29C 45/14065* (2013.01); *B29C 45/14467* (2013.01); *B32B 5/02* (2013.01); *B32B 5/22* (2013.01); *B32B 5/26* (2013.01); *B29C 45/14786* (2013.01); *B29C 2045/14131* (2013.01); *B32B 3/266* (2013.01); *B32B 2250/20* (2013.01); *B32B 2260/021* (2013.01); *B32B 2260/046* (2013.01); *B32B 2262/106* (2013.01); *B32B 2307/50* (2013.01); *B32B 2307/714* (2013.01); *B32B 2307/718* (2013.01); *B32B 2451/00* (2013.01); *B32B 2605/08* (2013.01)

(58) Field of Classification Search
None
See application file for complete search history.

(56) References Cited

U.S. PATENT DOCUMENTS

| | | | | |
|---|---|---|---|---|
| 3,445,559 | A * | 5/1969 | Siteman | B29C 45/14467 264/263 |
| 4,088,729 | A * | 5/1978 | Sherman | B24D 18/00 264/259 |
| 4,536,116 | A * | 8/1985 | Murray | B29C 33/123 16/441 |
| 4,653,236 | A * | 3/1987 | Grimes | B24D 13/14 451/490 |

* cited by examiner

*Primary Examiner* — Edmund Lee
(74) *Attorney, Agent, or Firm* — Bruce Stone LLP; Joseph Bruce (57) ABSTRACT

A method for manufacturing a composite material made ornament by using a mould assembly only involves: positioning of the fastener in the first mould, positioning of the composite material layers in the second mould, and then closing the mould assembly, injecting glue and drying, then obtaining a composite material made ornament. The glue injecting process enables the glue to be fully penetrated into the composite material layers to connect the composite material layer and the fastener, and to form the connecting portion at the same time, which not only improves the manufacturing efficiency, but also enhances the structure strength and quality of the product of the present invention. Furthermore, the composite material made ornament is fixed to the fixing member by the fastener, without the problem that the glue is likely to be aged or degraded, causing peeling off of the carbon fiber composite.

5 Claims, 9 Drawing Sheets

METHOD FOR MANUFACTURING A COMPOSITE MATERIAL MADE ORNAMENT

BACKGROUND OF THE INVENTION

Field of the Invention

The present invention relates to an ornament, and more particularly to a composite material made ornament, a mould assembly and a method for making the same.

Description of the Prior Art

Composite material, for example, carbon fiber composite material has found wide application in various fields due to its advantages of light weight, high strength and high corrosion resistance. Carbon fiber composite material is usually used as an ornament or a strengthening structure and manually laminated on an object which is made of a different material. However, in addition to the disadvantage that the manual laminating is extremely time consuming, the carbon fiber composite fiber is normally attached to the object by glue. The glue is very likely to be aged or degraded, and the carbon fiber composite will peel off once the glue is perished.

The present invention has arisen to mitigate and/or obviate the afore-described disadvantages.

SUMMARY OF THE INVENTION

The primary objective of the present invention is to provide a composite material made ornament, a mould assembly and a method for making the same, which is capable of overcoming the problem that the carbon fiber composite must be manually laminated by glue, and the glue is very likely to be aged or degraded, so that the carbon fiber composite will peel off once the glue is perished.

To achieve the above objective, a mould assembly for manufacturing a composite material made ornament in accordance with the present invention comprises:

a first mould includes a filling cavity and a positioning portion formed in the filling cavity, the filling cavity surrounds the positioning portion, the positioning portion is a column with a first section and a second section which is larger in diameter than the first section, the first mould is further provided with a plurality of feeding holes in communication with the filling cavity, the first mould is provided for positioning a fastener in the form of a nut, the fastener includes a fastening portion in the form of a threaded hole via which the fastener is sleeved onto the second section in a convex and concave manner, so that the fastening portion is hidden in the second section, the fastening portion is sleeved onto the second section and abutted against the first section; and a second mould includes a chamber for receiving a plurality of composite material layers, and a plurality of feeding holes in communication with the chamber, the chamber of the second mould will be connected to the filling cavity of the first mould after the first and second moulds are closed against each other.

To achieve the above objective, a method for manufacturing a composite material made ornament by using the abovementioned mould assembly comprises the following steps:

positioning of the fastener onto the positioning portion of the first mould, and making at least a part of the fastening portion of the fastener sink in the second section and abut against the first section of the positioning portion;

positioning the plurality of composition material layers in the chamber of the second mould;

closing the first and second moulds against each other to make the fastener press against the plurality of composite material layers;

injecting glue into the feeding holes of the first and second moulds, the glue containing adhesive agent and a plurality of fibers, the fibers have different lengths and are randomly blended with the adhesive agent in a disorder manner, the glue injected through the feeding holes of the first mould goes to the filling cavity, and the glue injected through the feeding holes of the second mould filters into the composite material layers, so that the space between the first and second moulds is filled with the glue;

drying the glue by heating the first and second moulds, so that the fibers in the glue will be penetrated into and fixed to the composite material layers to form a composite material made decorative board, and the glue in the filling cavity dries into a connecting portion which covers and is fixed to the fastener; and separating the first and second moulds from each other to take out the composite material made ornament.

To achieve the above objective, a composite material made ornament comprises:

a composite material made decorative board including a plurality of composite material layers which are connected to one another by an adhesive agent and a plurality of fibers, the fibers having different lengths and being disorderly arranged;

a fastener fixed to one surface of the composite material made decorative board and including a fastening portion, the fastener being a nut, and the fastening portion being a threaded hole; and a connecting portion being formed on one surface of the composite material made decorative board and the fastener.

With the abovementioned mould assembly, the composite material made ornament can be produced more rapidly. Connecting the composite material by glue injection contributes to strengthening structural strength. Besides, the composite material made ornament of the present invention is fixed to the fixing member by the fastener, the connection therebetween is more stable and stronger than glue, without the problem that the glue is likely to be aged or degraded, causing peeling off of the carbon fiber composite.

DETAILED DESCRIPTION OF THE
PREFERRED EMBODIMENTS

The present invention will be clearer from the following description when viewed together with the accompanying drawings, which show, for purpose of illustrations only, the preferred embodiment in accordance with the present invention.

Referring to the drawings, a method for manufacturing a composite material made ornament in accordance with the present invention is used in combination with a mould assembly to produce the composite material made ornament. The mould assembly comprises: a first mould 10 and a second mould 20.

Figure 1:
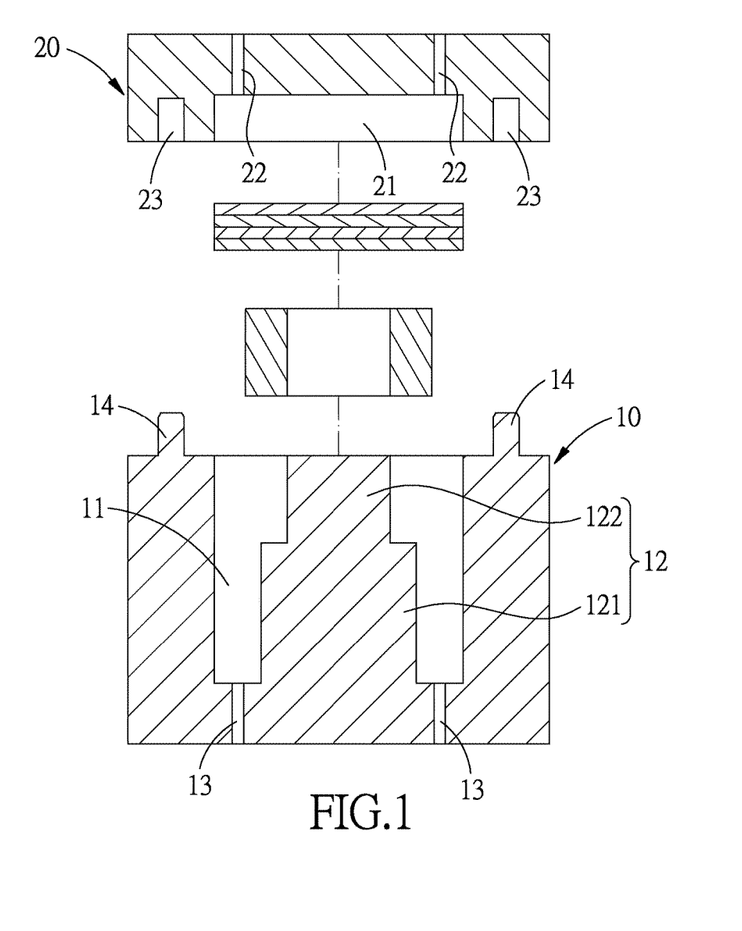
FIG. 1 is an exploded view of a mould assembly for manufacturing a composite material made ornament in accordance with the present invention.

The first mould 10 includes a filling cavity 11 and a positioning portion 12 formed in the filling cavity 11. In this embodiment, the filling cavity 11 is an annular cavity to surround the positioning portion 12. The filling cavity 11 is not limited to the annular shape and can also be a square or polygonal cavity. The positioning portion 12 is a column with a first section 121 and a second section 122 which is larger in diameter than the first section 121. The first mould 10 is further provided with a plurality of feeding holes 13 in communication with the filling cavity 11. On an end surface of the first mould 10 is formed a plurality of guiding protrusions 14. The first mould 10 is provided for positioning a fastener A which is a nut in this embodiment. The fastener A includes a fastening portion A1 in the form of a threaded hole via which the fastener A is sleeved onto the second section 122 in a convex and concave manner, so that the fastening portion A1 is hidden in the second section 122. The fastening portion A1 is sleeved onto the second section 122 and abutted against the first section 121.

The second mould 20 includes a chamber 21 for receiving a plurality of composite material layers B, and a plurality of feeding holes 22 which are in communication with the chamber 21. At an end surface of the second mould 20 is formed a plurality of guiding holes 23. The composite material layers B are made of carbon fiber. The chamber 21 of the second mould 20 is aligned with and can be connected to the filling cavity 11 of the first mould 10 after the first and second moulds 10, 20 are closed against each other.

Figure 3:
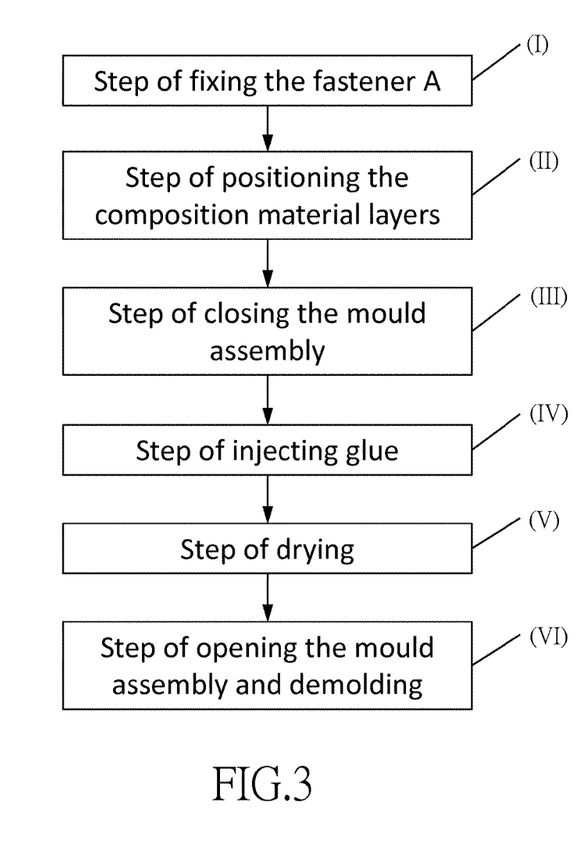
FIG. 3 is a flow chart showing the steps of a method for manufacturing the composite material made ornament in accordance with the present invention.

The method for manufacturing a composite material made ornament by using the abovementioned mould assembly comprises the following steps:

Step 1 of fixing the fastener A includes positioning of the fastener A onto the positioning portion 12 of the first mould 10, and making at least a part of the fastening portion A1 of the fastener A sink in the second section 122 and abut against the first section 121 of the positioning portion 12;

Step 2 of positioning the composition material layers includes positioning of the plurality of composition material layers B in the chamber 21 of the second mould 20;

Step 3 of closing the mould assembly includes closing the first and second moulds 10, 20 against each other, inserting the guiding protrusion 14 of the first mould 10 into the guiding holes 23 of the second mould 20, the fastener A will be pressed against the plurality of composite material layers B after the mould assembly is closed;

Step 4 of injecting glue includes injecting glue C into the feeding holes 13, 22 of the first and second moulds 10, 20. The glue C contains adhesive agent C1 and a plurality of fibers C2. The glue C can be resin or thermoplastic member. The resin includes epoxy resin, Polyurethane or vinyl ester. The thermoplastic material includes Nylon, polycarbonate, or Polyurethane. The fibers can be carbon fiber, glass fiber, Mineral fibers (basalt fibers, asbestos fibers) or man-made fibers. The fibers C2 have different lengths and are randomly blended with the adhesive agent C1 in a disorder manner. The glue C injected through the feeding holes 13 of the first mould 10 goes to the filling cavity 11, and the glue C injected through the feeding holes 22 of the second mould 20 filters into the composite material layers B, so that the space between the first and second moulds 10, 20 is filled with the glue C.

The step 5 of drying includes drying the glue C by heating the first and second moulds 10, 20, so that the fibers C2 in the glue C will be penetrated into and fixed to the composite material layers B to form a composite material made decorative board 30, and the glue C in the filling cavity 11 dries into a connecting portion 40 which covers and is fixed to the fastener A.

Step 6 of opening the mould assembly and demolding includes separating the first and second moulds 10, 20 from each other to take out a composite material made ornament.

The procedure of the method for manufacturing the composite material made ornament by using the abovementioned mould assembly is very simple, since it only involves: positioning of the fastener A in the first mould 10, positioning of the composite material layers B in the second mould 20, then closing the mould assembly, injecting glue and drying. With the arrangement of the filling cavity 11 and the positioning portion 12 of the first module 10, the glue C can connect the fastener A and the composite material layers B after the process of glue injecting and drying, and the connecting portion 40 is also formed at the same time. The glue injecting process enables the glue C to be fully penetrated into the composite material layers B to connect the composite material layer B and the fastener A, and to form the connecting portion 40 at the same time, which not only improves the manufacturing efficiency, but also enhances the structure strength and quality of the product of the present invention.

Figure 4:
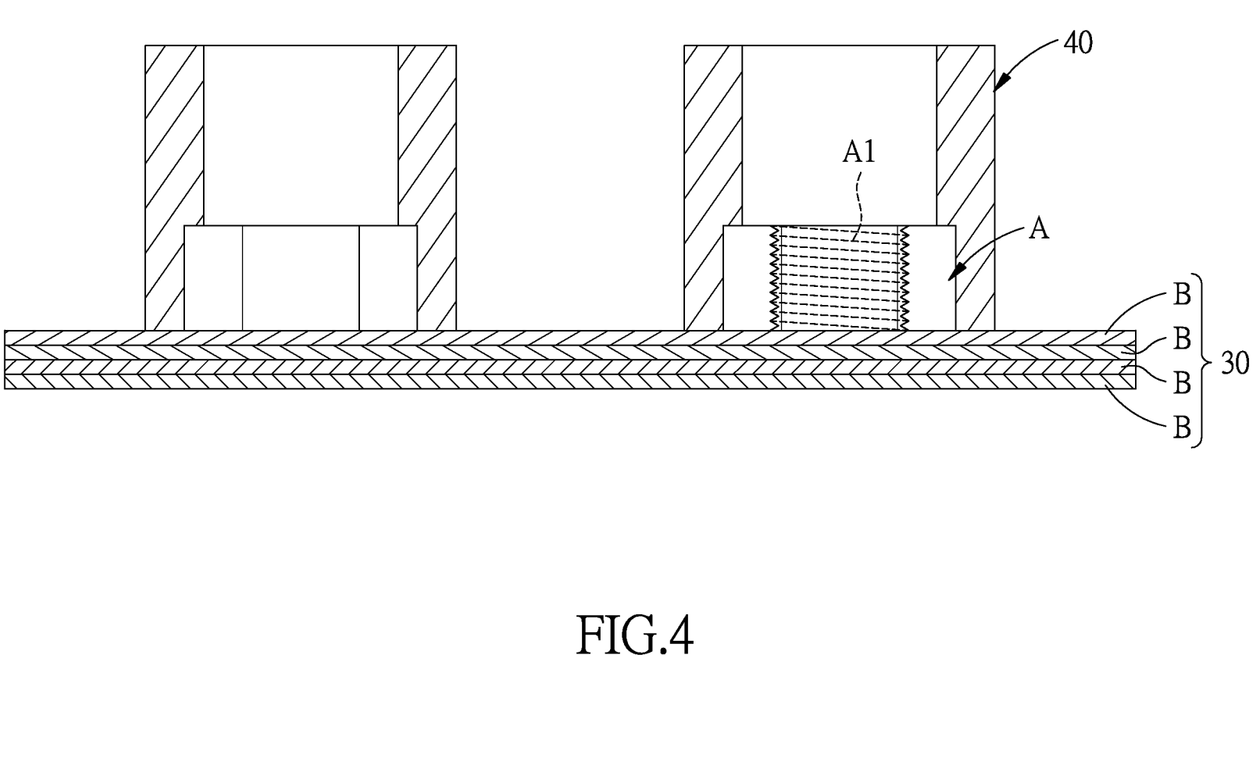
FIG. 4 is a cross sectional view of a composite material made ornament in accordance with the present invention.

The composite material made ornament made by the above method comprises: the composite material made board 30, the fastener A, and the connecting portion 40.

The composite material made decorative board 30 includes the plurality of composite material layers B which are connected to one another by the adhesive agent C1 and the plurality of fibers C2. The glue C contains adhesive agent C1 and a plurality of fibers C2. The glue C can be resin or thermoplastic member. The resin includes epoxy resin, Polyurethane or vinyl ester. The thermoplastic material includes Nylon, polycarbonate, or Polyurethane. The fibers can be carbon fiber, glass fiber, Mineral fibers (basalt fibers, asbestos fibers) or man-made fibers. The fibers C2 have different lengths and are randomly blended with the adhesive agent C1 in a disorder manner.

The fastener A is fixed to one surface of the composite material made decorative board 30 and includes the fastening portion A1. The fastener A in this embodiment is a nut, and the fastening portion A1 is a threaded hole.

Figure 2:
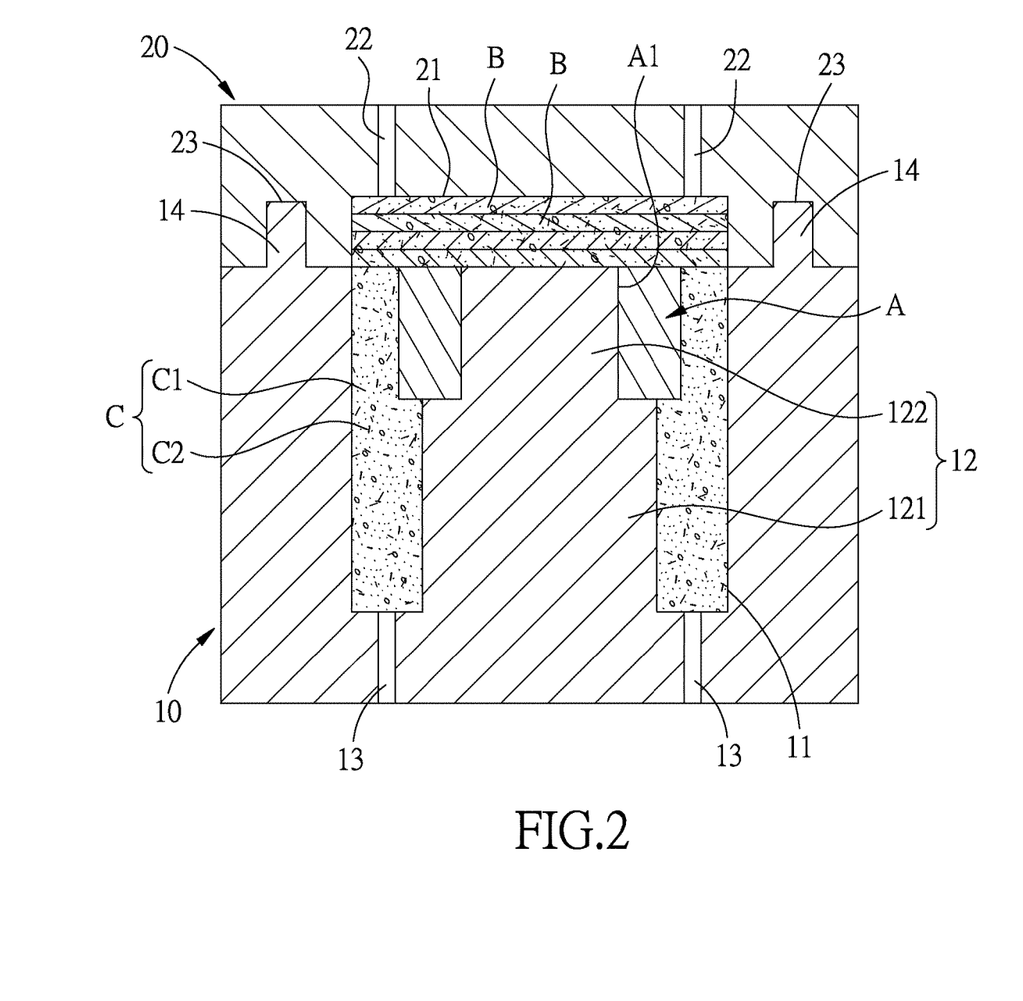
FIG. 2 is an assembly view of the mould assembly for manufacturing a composite material made ornament in accordance with the present invention.

The connecting portion 40 is formed on one surface of the composite material made decorative board 30 and the fastening portion A1 simultaneously. The connecting portion 40 in this embodiment is a columnar structure with a circular, square or polygonal section. As shown in FIGS. 1 and 2, the location and number of the connecting portion 40 on the composite material made decorative board 30 are not restricted. There can be two connecting portions 40 formed on the composite material made decorative board 30, as shown in FIGS. 3-6. The number of the connecting portion 40 is equal to that of the fastener A.

FIGS. 5-8 show the application of the composite material made ornament. The composite material made decorative board 30 can be decorated with color, pattern, trademark or other decorative elements. The object D to which the composite material made decorative board 30 fixed is provided with an inserting portion D1 for insertion of the connecting portion 40, so that the connecting portion 40 is inserted in the inserting portion D1 and fixed by a fixing member E. The fastener A is a nut, and the fixing member E is a screw. Or, the fastener A can be a screw, and the fixing member E is a nut.

Figure 5:
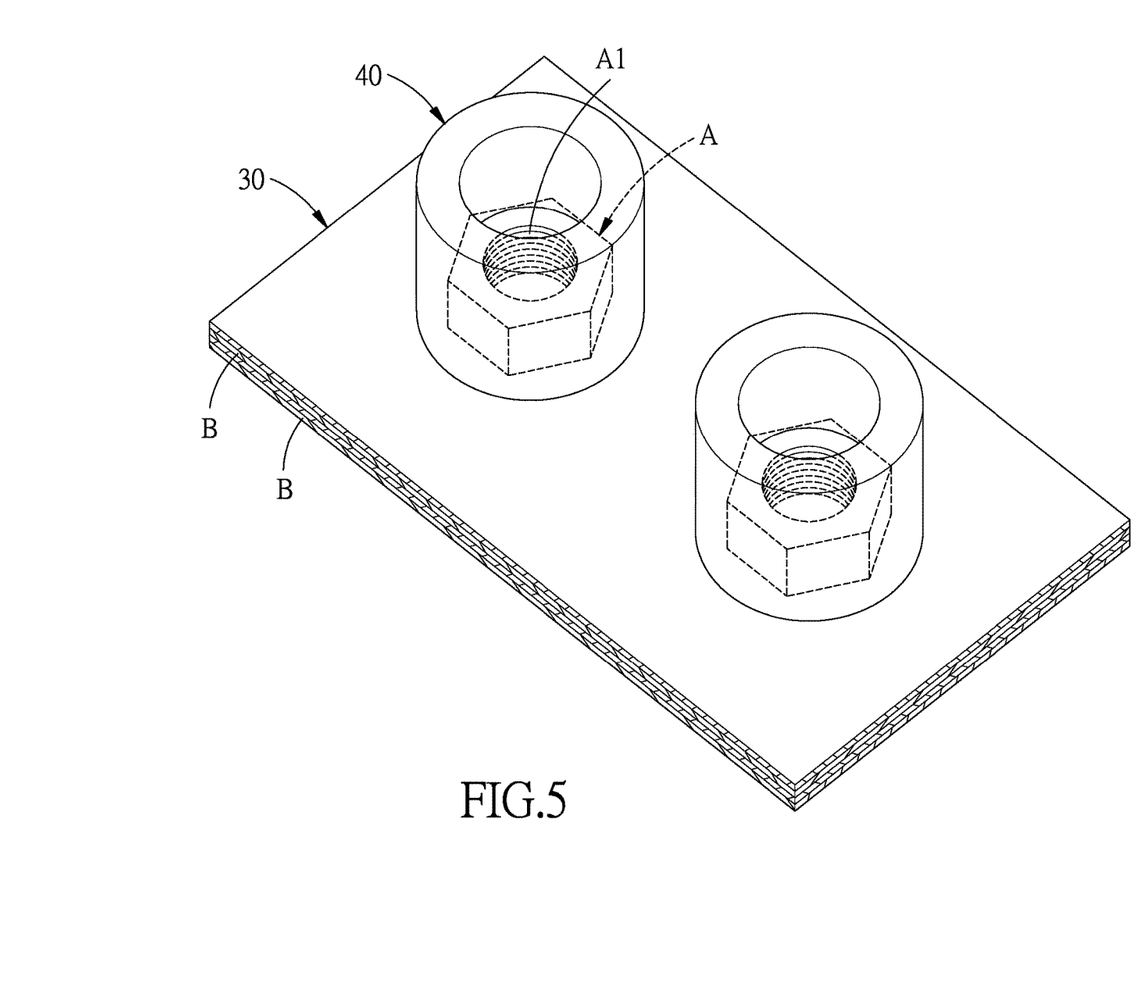
FIG. 5 is a perspective view of the composite material made ornament in accordance with the present invention.
Figure 6:
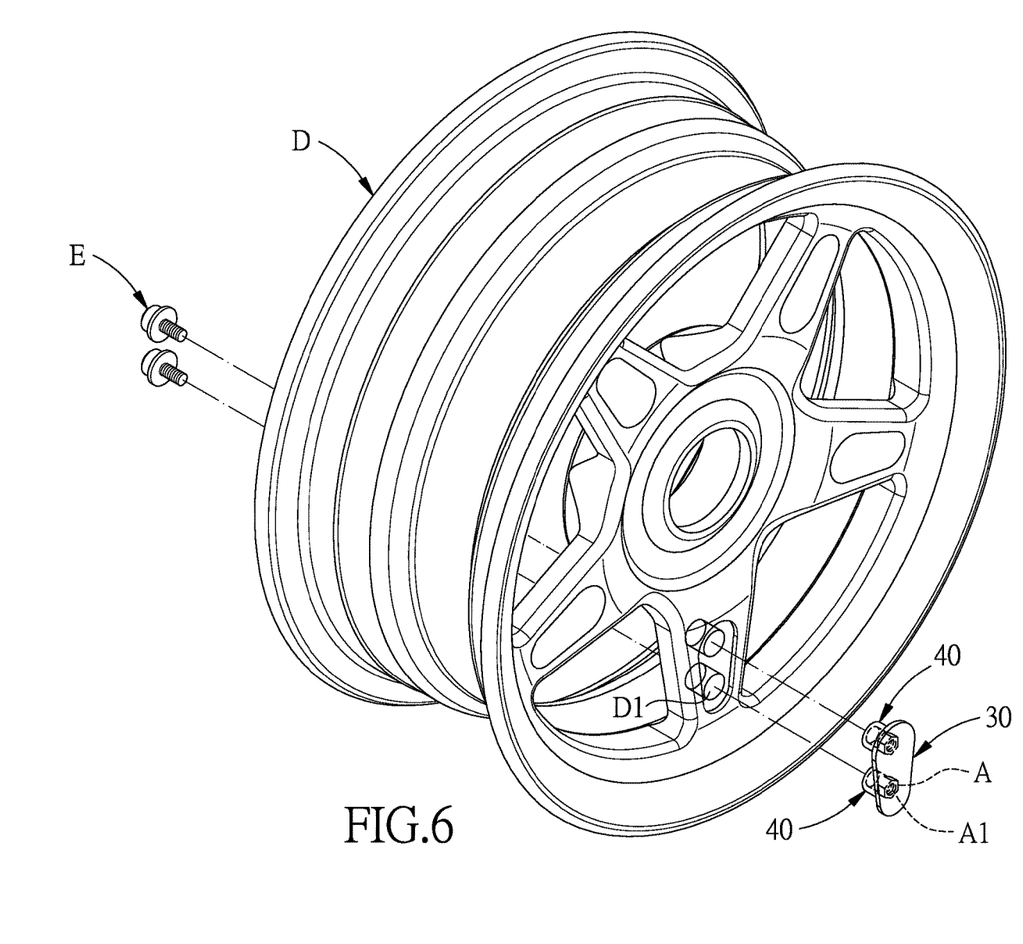
FIG. 6 is an illustrative view showing that the composite material made ornament in accordance with the present invention and a wheel boss.
Figure 7:
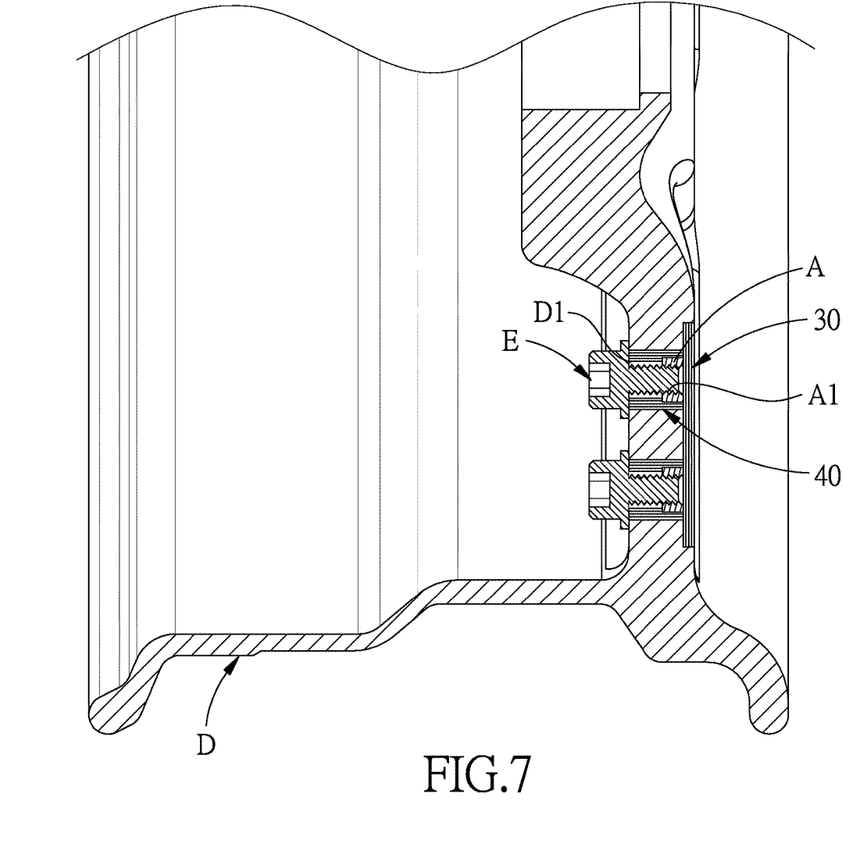
FIG. 7 is a cross sectional view showing that the composite material made ornament in accordance with the present invention is assembled on a wheel boss.
Figure 8:
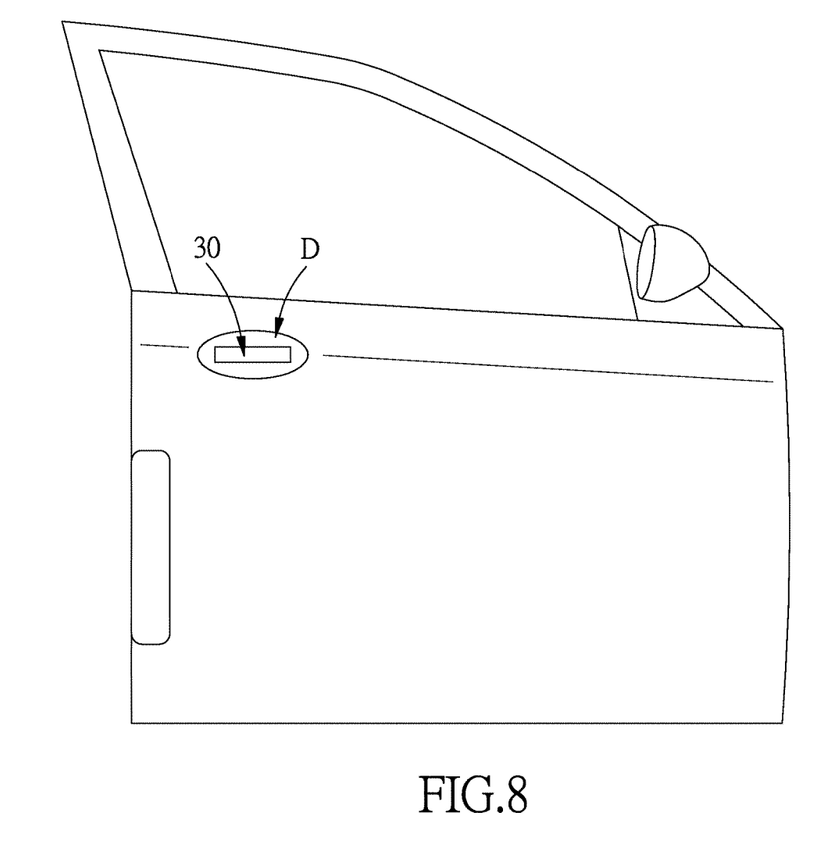
FIG. 8 is an illustrative view showing that the composite material made ornament in accordance with the present invention is assembled on a door handle.
Figure 9:
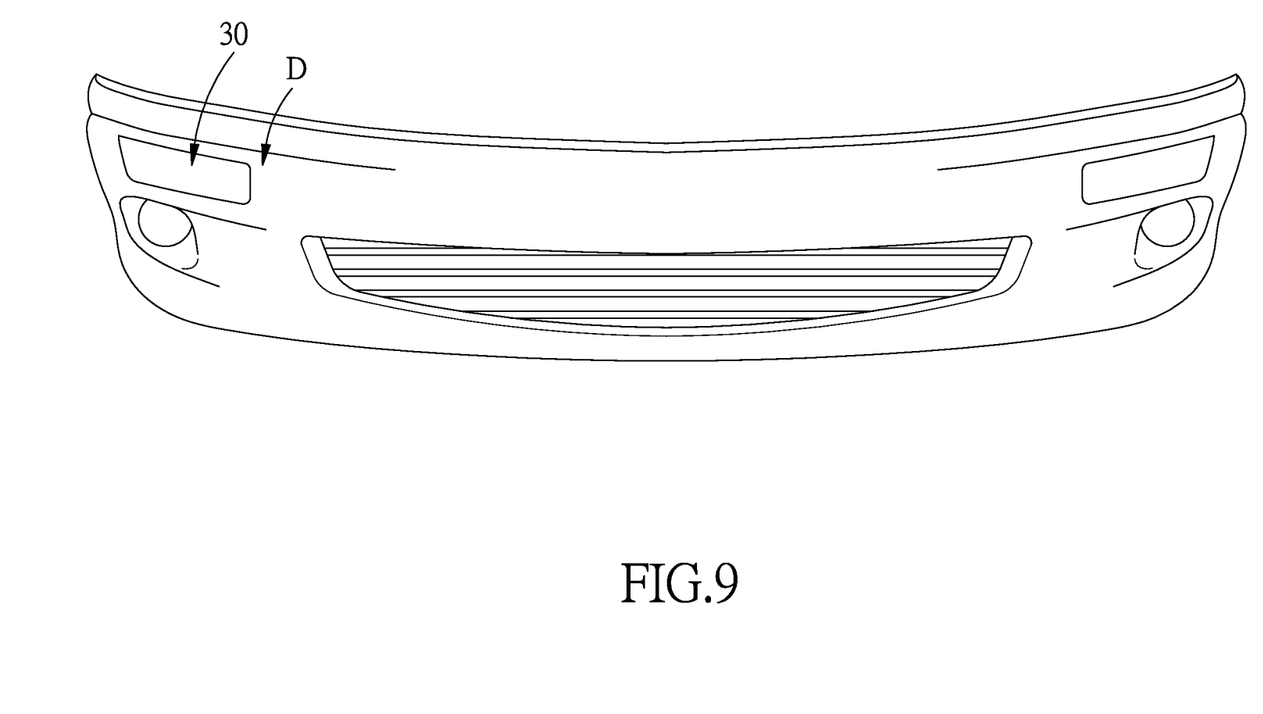
FIG. 9 is an illustrative view showing that the composite material made ornament in accordance with the present invention is assembled on a bumper.

As shown in FIG. 5, the object D can be a wheel boss, and the composite material made ornament can be fixed to the object D. As shown in FIGS. 7 and 8, the object D can be a door handle or a bumper. When fixed on the door handle or the bumper, the composite material made decorative board 30 can also be used as a reinforcing structure, in addition to being used for decorative purpose. Furthermore, the composite material made ornament of the present invention is fixed to the fixing member E by the fastener A, the connection therebetween is more stable and stronger than glue, without the problem that the glue is likely to be aged or degraded, causing peeling off of the carbon fiber composite.

While we have shown and described various embodiments in accordance with the present invention, it is clear to those skilled in the art that further embodiments may be made without departing from the scope of the present invention.

What is claimed is:

1. A method for manufacturing a composite material made ornament by using the mould assembly comprises the following steps:
    positioning of a fastener onto a positioning portion of a first mould, and making at least a part of a fastening portion of the fastener sink in a second section and abut against a first section of the positioning portion;
    positioning a plurality of composition material layers in a chamber of a second mould;
    closing the first and second moulds against each other to make the fastener press against the plurality of composite material layers;
    injecting glue into feeding holes of the closed first and second moulds, the glue containing adhesive agent and a plurality of fibers, the fibers have different lengths and are randomly blended with the adhesive agent in a disorder manner, the glue injected through the feeding holes of the first mould goes to a filling cavity of the first mould, and the glue injected through the feeding holes of the second mould filters into the composite material layers, so that a space between the closed first and second moulds is filled with the glue;
    drying the glue by heating the closed first and second moulds, so that the fibers in the glue will be penetrated into and fixed to the composite material layers to form a composite material made decorative board, and the glue in the filling cavity dries into a connecting portion which covers and is fixed to the fastener; and
    separating the closed first and second moulds from each other to take out the composite material made ornament.

2. The method for manufacturing the composite material made ornament as claimed in claim 1, wherein the glue is a resin or thermoplastic member.

3. The method for manufacturing the composite material made ornament as claimed in claim 2, wherein the resin includes epoxy resin, Polyurethane or vinyl ester.

4. The method for manufacturing the composite material made ornament as claimed in claim 2, wherein the thermoplastic material includes Nylon, polycarbonate, or Polyurethane.

5. The method for manufacturing the composite material made ornament as claimed in claim 1, wherein the fibers include carbon fiber, glass fiber, Mineral fibers, basalt fiber, asbestos fibers, or man-made fibers.

* * * * *